March 18, 1930.  W. G. BUNKER  1,751,391
POTATO SEPARATOR
Filed May 20, 1927   3 Sheets-Sheet 1
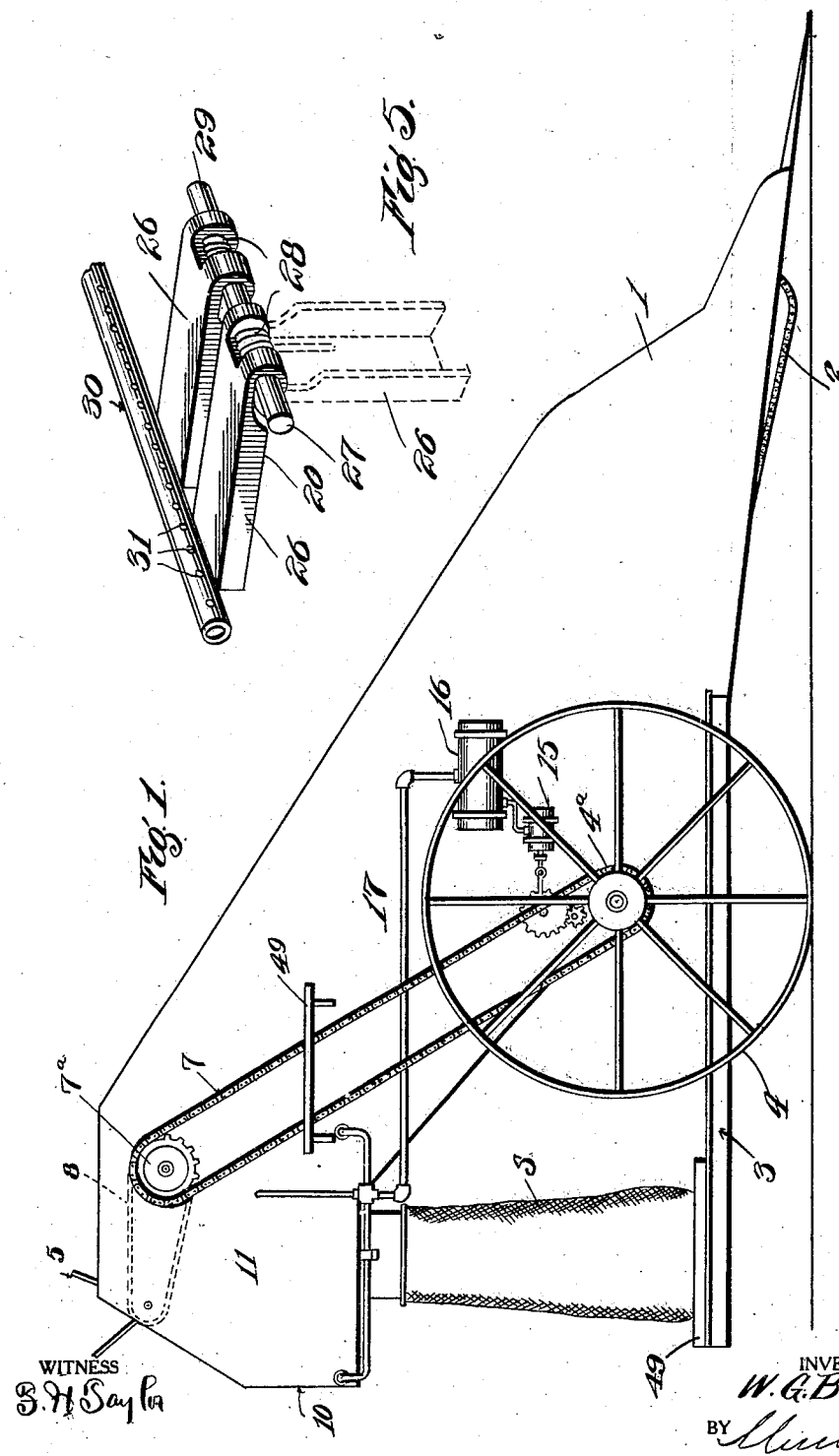

March 18, 1930.  W. G. BUNKER  1,751,391
POTATO SEPARATOR
Filed May 20, 1927   3 Sheets-Sheet 2
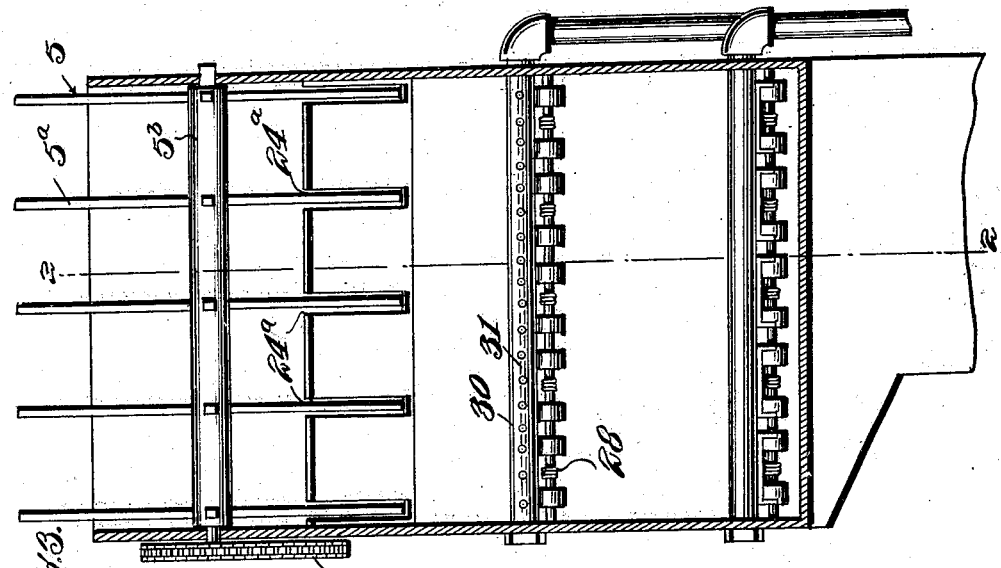
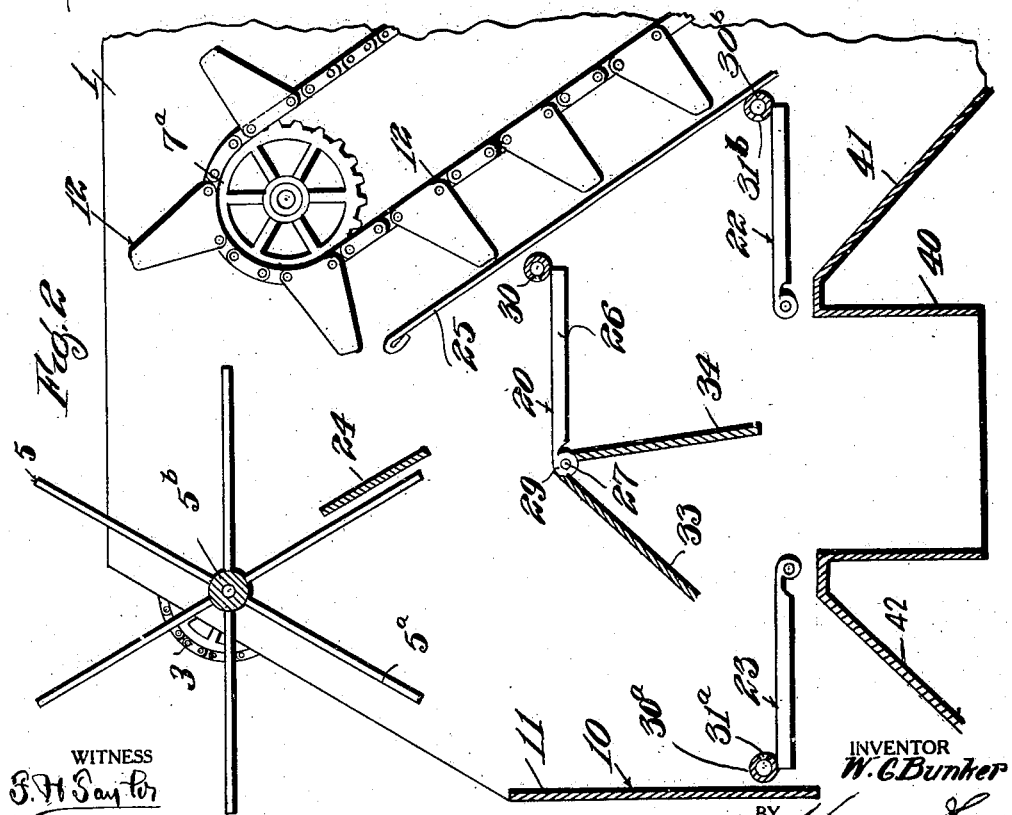
INVENTOR
W. G. Bunker

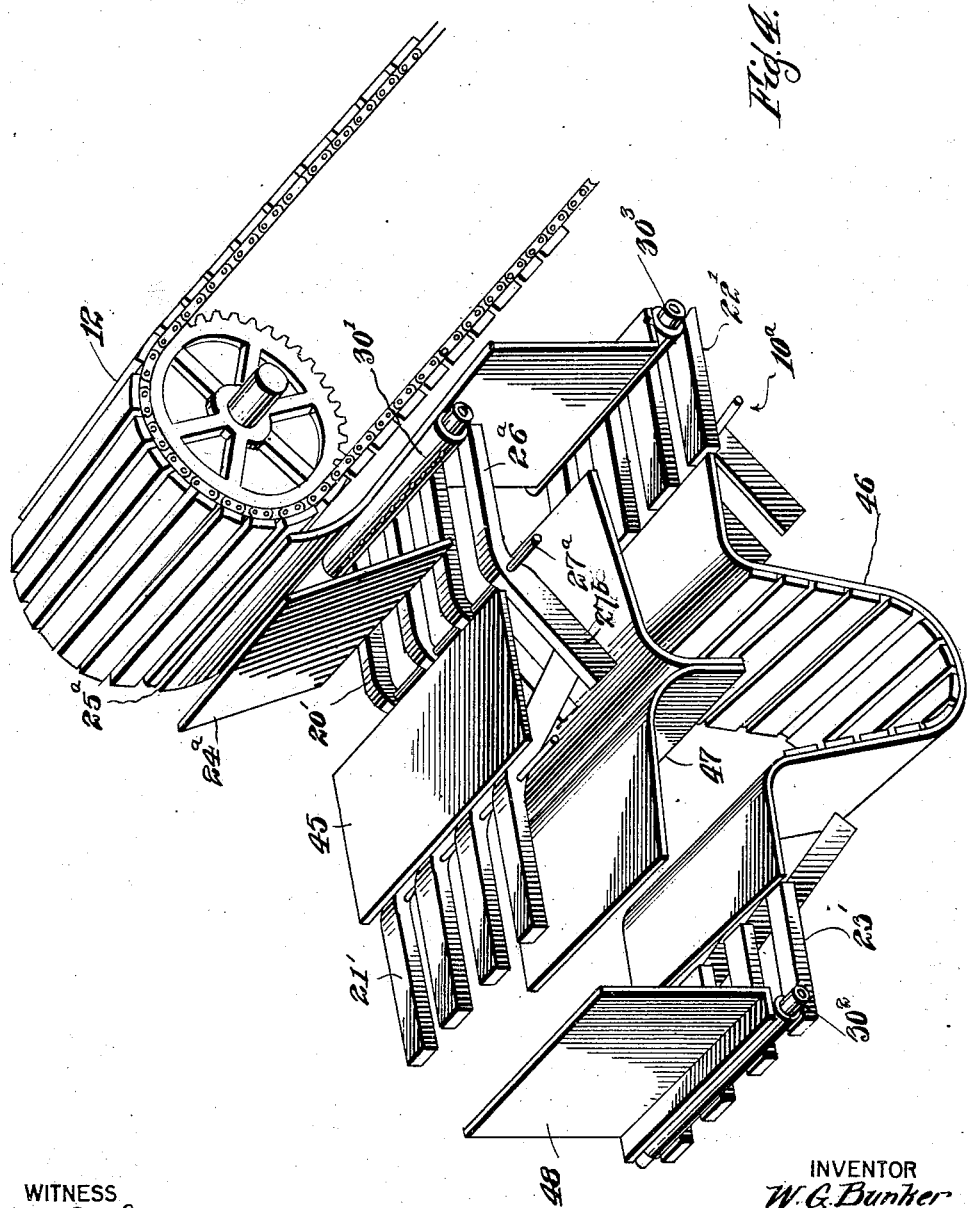

Patented Mar. 18, 1930

1,751,391

UNITED STATES PATENT OFFICE

WILLIAM G. BUNKER, OF AUGUSTA, MAINE

POTATO SEPARATOR

Application filed May 20, 1927. Serial No. 192,997.

This invention relates to agricultural implements and more particularly to potato separators.

A primary object of the invention is to provide a device of this character to be used in connection with a potato digger which digs the potatoes, and elevates them and discharges them into the separator, where they are sorted, cleaned, and sacked, as the digging operation progresses.

Another object of the invention is to provide an implement of this character in which balanced separating fingers are employed and a gravity system used in connection both with the fingers and the winnowing process.

Another object is to so tension the separating fingers that the lightest stone will be dropped without permitting the lighest potato to go through so that the air blast will pass the potatoes into the sluice or conveyor provided for this purpose.

Another object is to so construct an implement of this character that mechanical operations will be minimized and yet the potatoes will be effectively separated from the stones and other trash.

In carrying out these objects, the invention is susceptible of a wide range of modification without departing from the spirit or sacrificing any of the advantages of the claimed invention; there being shown in the drawings for illustrative purposes a preferred and practical form, in which;

Figure 1 is a side elevation of the separator shown in connection with a conventional digger, Fig. 2 is a longitudinal vertical section through the separator, taken on the line 2—2 of Fig. 3, Fig. 3 is a transverse section taken on the line 3—3 of Fig. 2, Fig. 4 is a perspective view of a slightly different form of potato separator constructed in accordance with this invention and shown associated with the conveyor or carrier belt leading from the digger which is not shown, and Fig. 5 is a detail perspective view of a portion of one of the flexible platforms with the fingers shown in operative position in full lines and in lowered position in dotted lines.

In the embodiment illustrated, the separator constituting the invention is designed to be used in connection with any commercial digger shown conventionally at 1, the carrier belt 2 of which is shown positioned to deliver the potatoes together with stones, clods, tops and weeds, dug up with the potatoes to the elevating conveyor 12 which delivers them to the sorting means presently to be described.

A revolving fork 5, shown in Figs. 1 and 2, is located at the top of the separator adjacent the elevator 12 to engage and remove the potato tops, weeds, large stones and the like, and drop them behind the machine.

The digger 1 in connection with which this separator is used, includes a main frame 3 supported by rear wheels 4, the front being supported by a tractor, not shown.

Mounted on this main frame is a superstructure carrying the power transmission mechanism and the conveyor 12 with which the present invention is concerned. This conveyor is actuated by a sprocket chain 7 passed around a sprocket wheel $4^a$ driven by the ground wheels 4 and at its upper end extends around a similar sprocket $7^a$ which operates to drive the elevator 12 and also through the belt 8 drives the revolving fork 5.

A suitable air compressor 15 is connected with an air storage tank 16 from which air is conveyed by means of a pipe 17 to the winnowing apparatus presently to be described.

Located within the housing 11 of the separator are a plurality of separating or sorting platforms, three of which are shown and numbered respectively, 20, 22 and 23 in Fig. 2 and four in Fig. 4 and numbered 20', 21', 22' and 23'.

In Figs. 2, 3 and 5 the sorting and separating means constituting the invention comprises a balanced receiving platform 20 positioned below the upper end of the elevator 12 and onto which the potatoes, soil and stones are dropped, being directed thereonto by a guide plate or board 24 and a plate 25 which latter also operates as a shield or protector for the lower stretch of the elevator 12.

This platform 20 is composed of a plurality of independent slats 26 swingably mounted on a shaft 27 as shown in detail in Fig. 5. These slats are normally held balanced in horizontal position by springs 28 and are held against upward movement by an air supply pipe 30 which extends transversely across the upper faces of the free ends of the slats 26 as shown in Fig. 5. Each slat 26 is provided at its hinged end with laterally spaced knuckles 29 between which its spring 28 is coiled on shaft 27. One end of each spring 28 is secured to the shaft 27 and the other end 28$^a$ extended and engaged with the lower face of the slat, as shown in Fig. 5 and exerts a tension to hold the slat up, the spring being adjusted to adapt the slat to remain elevated until articles of a predetermined weight have been deposited thereon when the spring will be overcome and the slat lowered causing the material resting thereon to drop down onto the platform 22 below after the lighter articles have been blown from the platform 20 to the platform 23 by means of an air blast from pipe 30, the articles being directed by a guide 33.

The air blast pipe 30 is provided with a longitudinal series of perforations 31 arranged to discharge air under pressure onto the platform 20 and to blow the potatoes which drop onto the platform over the guide 33 to the platform 23 where they are again subjected to another air blast from a pipe 30$^a$ constructed and arranged in relation to platform 23 similarly to pipe 30 and platform 20.

When stones or the like have accumulated on platform 20 to a weight sufficient to overcome the springs 28 the slats 26 as a unit or individually drop down under such weight and deposit the articles, among which may be larger sized potatoes, onto platform 22 where an air blast from pipe 30$^b$ blows the potatoes into a bag chute 40 which is arranged between the platforms 22 and 23 as shown in Fig. 2.

The accumulation of stones on platforms 22 and 23, when reaching a weight sufficient to overcome the springs 28 of the slats forming the platforms, are dumped into the chutes 41 and 42 and discharged onto the ground or, if desired, into suitable receptacles provided for the purpose.

A vertical baffle 34 is arranged below the slat supporting shaft of platform 20 with its lower edge positioned in a plane slightly above that of platforms 22 and 23 and is designed to prevent the potatoes blown from these platforms from passing across the chute 40 and directs them into said chute from which they drop into a sack S secured to the chute as shown in Fig. 1.

The guide board 24 is slotted transversely as shown at 24$^a$ for the passing therethrough of the tines 5$^a$ of the revolving fork 5. These tines 5$^a$ radiate from a shaft 5$^b$ being arranged in longitudinally spaced groups or series five of which are shown, each group consisting of six tines. The fork 5 revolves in the direction of the arrow $a$ and receives the tops, weeds, sod, and the like, from the elevator 12 and discharges it onto the ground at the rear of the machine.

It will thus be seen that a gravity system is employed in both the winnowing process and the spring balanced or counterbalanced fingers. The tension of the springs which control the downward movement of the fingers or slats 26 is adjusted to drop the lightest stone, and yet the lightest potato will not go through and the air blast will take these potatoes to the sluice and deposit them in the sack. It will be observed that the two processes operate three separate times before the potatoes are deposited in the sacks.

In the form shown in Fig. 4 the apparatus operates in the same manner as that described in the other figures except that the slats or fingers from which the various platforms 20', 21', 22', and 23', are formed are weight balanced instead of spring controlled, and instead of three platforms being employed, four are shown, the platform 21' being arranged in the same plane with the platform 20' and the potatoes which are blown off from platform 20' by the air blast from the pipe 30' are passed over a board 45 which bridges the space between the two platforms 20' and 21'. From the platform 21' the potatoes drop down onto the platform 23' where they are again subjected to an air blast from the pipe 30$^2$ which blows them into the sluice 46 from which they are conveyed to a suitable place of deposit. Any stones, dirt or the like drop through platform 20' onto either platform 22' or the shield 47, or both, and pass through platform 22' to the ground. From the platform 21' dirt, stones, etc., drop on to the shield 47 and are conducted to the ground in a similar manner.

A combined shield and guide 47 is arranged over the sluice 46 and is designed to receive stones, dirt, and the like, which are dropped from the platforms 20' and 21' and conducted onto the platform 22' which deposits it on the ground or at any suitable point.

A sluice or guide is shown in this form of the invention for directing the potatoes and the like from the conveyor 12 onto the platform 20' and consists of two boards 24$^a$ and 25$^a$ arranged as shown, one under the conveyor over the pipe 30' and the other spaced laterally therefrom which operate to direct the material onto the sorting platform.

The slats or fingers 26$^a$ from which the various platforms are constructed are here shown made obtuse angled or elbow-shaped with the shaft 27$^a$ passing through them at a point adjacent the bend therein. The arms 27$^b$ depend and operate as weights for holding the slats 26$^a$ in raised position and when the weight of them is overcome by the material on the platform, the platform tilts, or rather, the individual slats thereof tilt and deposit the material onto the platform 22′ below it. As shown in Fig. 4 the weighted arms 27$^b$ of the platforms 20′ and 21′ are arranged in staggered relation so that one will operate between two of the others and thus not interfere.

An air blast pipe 30$^3$ is shown arranged in connection with the platform 22′ so that the potatoes which drop onto the platform may be blown therefrom into the sluice 46 while the stones drop to the ground beneath.

A baffle 48 is arranged at the rear of the platform 23′ to prevent the potatoes blown from the platform 21′ from passing beyond the machine, this plate operating to direct them onto the platform 23′.

From the above description, it will be obvious that the operation of the machine shown in Fig. 4 is similar to that shown and described in relation to the other figures, a gravity system being employed in both forms of the invention.

A shelf 49 is disposed in convenient position to hold the sacks to be used in sacking the potatoes so that an operator standing on the platform 3 may conveniently change from a filled to an empty sack when necessary.

It will thus be seen that by use of this separator in connection with a potato digger that the potatoes may be readily dug, cleaned and sacked in a rapid and convenient manner.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

I claim:—

1. In a gravity separator for potatoes and the like, a supporting structure, a tilting platform on said structure to receive the material to be separated, means for passing an air blast over said platform to separate the lighter from the heavier material and conduct it to a place of deposit, means for normally holding said platform in elevated operative position and releasable when the material on the platform reaches a predetermined weight, whereby the platform is tilted and the heavier material discharged therefrom.

2. In a gravity separator for potatoes and the like, a supporting structure, a tilting platform on said structure to receive the material to be separated, said platform being composed of elements movable either independently or in unison, means for holding said platform against upward movement beyond a predetermined point, means for passing an air blast over said platform to separate the lighter from the heavier material and conduct it to a place of deposit, means for normally holding said platform in elevated operative position and releasable when the material on the platform reaches a predetermined weight, whereby the platform is tilted and the heavier material discharged therefrom.

3. In a potato separator a supporting structure, a receiver for the material to be separated, winnowing means operable over said receiver to blow off the lighter material, another receiver positioned to receive the material blown off from the first receiver, said receivers being composed of a plurality of vertically movable slats adapted to swing down under a predetermined load to discharge the material not blown off by the winnowing means.

4. In a potato separator a supporting structure, a receiver for the material to be separated, winnowing means operable over said receiver to blow off the lighter material, another receiver positioned to receive the material blown off from the first receiver, said receivers being composed of a plurality of vertically movable slats adapted to swing down under a predetermined load to discharge the material not blown off by the winnowing means, and yieldable means for holding said slats in operative position.

5. In a potato separator a supporting structure, a receiver for the material to be separated, winnowing means operable over said receiver to blow off the lighter material, another receiver positioned to receive the material blown off from the first receiver, said receivers being composed of a plurality of vertically movable slats adapted to swing down under a predetermined load to discharge the material not blown off by the winnowing means, said slats being operable either individually or in unison.

WILLIAM G. BUNKER.